United States Patent [19]

Tomikawa

[11] Patent Number: 4,760,572
[45] Date of Patent: Jul. 26, 1988

[54] LIMITED MULTICAST COMMUNICATION METHOD AND COMMUNICATION NETWORK SYSTEM REALIZING THE METHOD

[75] Inventor: Masataka Tomikawa, Tokorozawa, Japan

[73] Assignee: Kabushiki Kaisha Toshiba, Kawasaki, Japan

[21] Appl. No.: 945,529

[22] Filed: Dec. 23, 1986

[30] Foreign Application Priority Data

Dec. 27, 1985 [JP] Japan ............................... 60-293141
Feb. 28, 1986 [JP] Japan ................................. 60-41503

[51] Int. Cl.⁴ ............................................. H04J 3/26
[52] U.S. Cl. ..................................... 370/94; 370/60; 340/825.52
[58] Field of Search ............... 340/825.07, 825.52; 370/94, 60, 85, 62

[56] References Cited

U.S. PATENT DOCUMENTS 4,534,024 8/1985 Maxemchuk et al. ............... 370/60
4,538,263 8/1985 Gabrielli et al. ...................... 370/94
4,716,410 12/1987 Nozaki ......................... 340/825.52

FOREIGN PATENT DOCUMENTS 0021653 2/1985 Japan ..................................... 370/94

Primary Examiner—Douglas W. Olms
Assistant Examiner—Melvin Marrelo
Attorney, Agent, or Firm—Foley & Lardner, Schwartz, Jeffery, Schwaab, Mack, Blumenthal & Evans

[57] ABSTRACT

According to this invention, a limited multicast communication notice indicating that an identical message is transmitted to a plurality of arbitrarily designated stations is transmitted prior to transmission of a text message. The notice includes definition data. The notice is received by a data input/output section, and it is checked by a comparator if the notice is a message destined to be sent to the intrastation. If it is discriminated that the notice is destined to be sent to the intrastation, the notice is received, and the definition data in the notice is held in the comparator. Thereafter, a CPU forms a response message and sends it to a source station. Thereafter, a text message is transmitted using limited multicast transmission. It is checked by the comparator if the received message includes the same definition data held in the comparator. As a result, if the received message includes the definition data, the message is received by the serial input/output section and is stored therein.

15 Claims, 10 Drawing Sheets

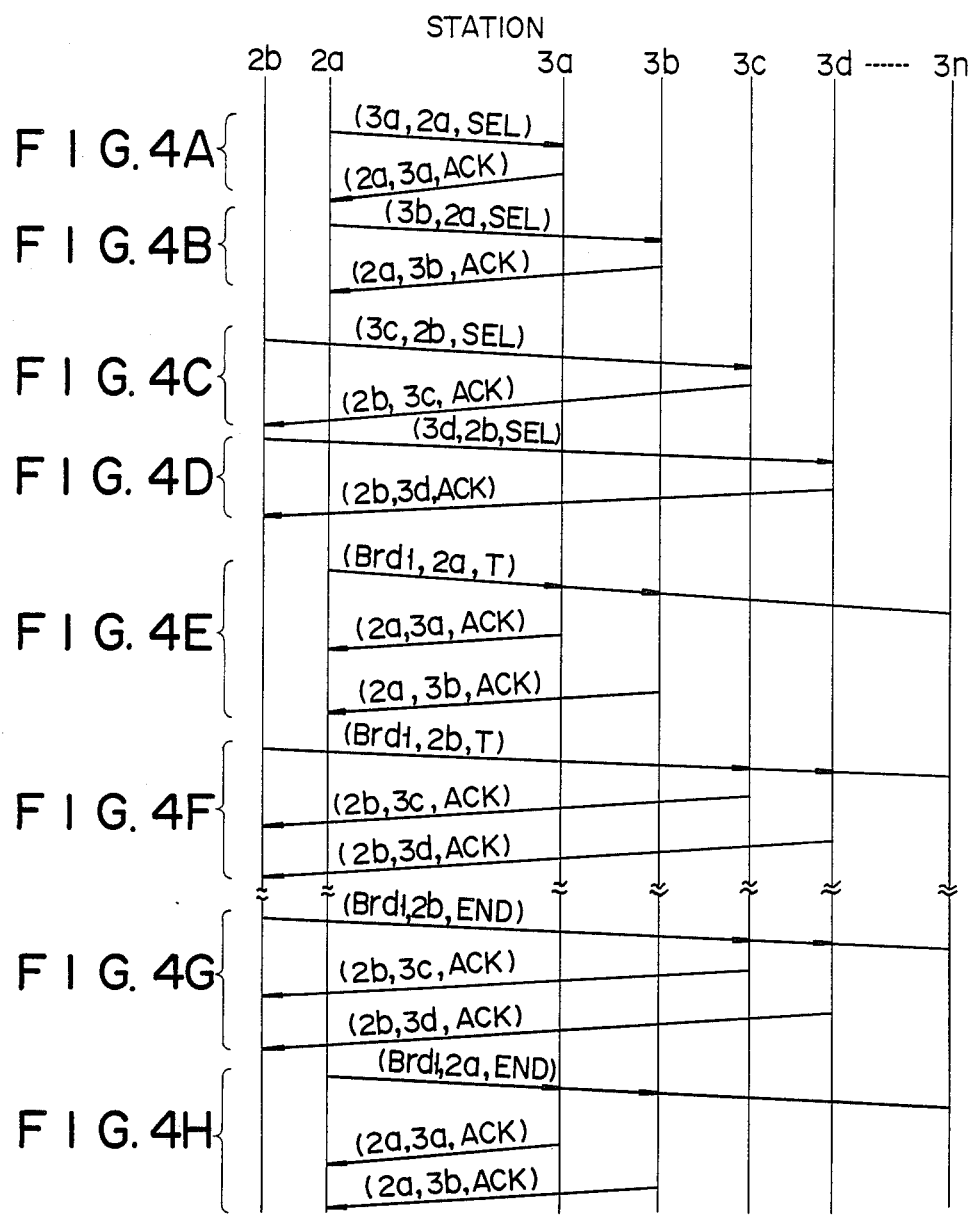

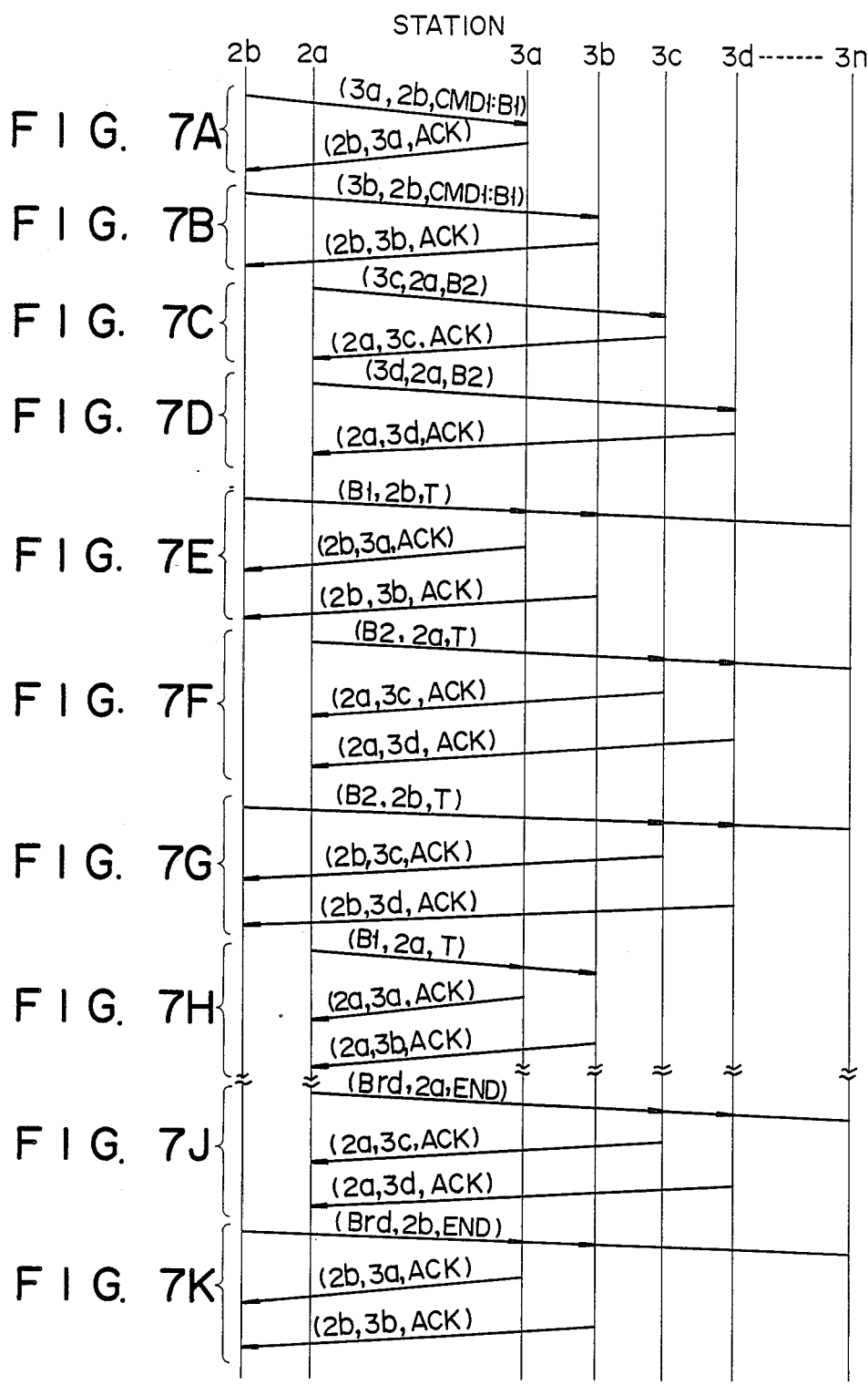

LIMITED MULTICAST COMMUNICATION METHOD AND COMMUNICATION NETWORK SYSTEM REALIZING THE METHOD

BACKGROUND OF THE INVENTION

The present invention relates to a multicast message communication system and, more particularly, to a limited multicast communication method which can simultaneously transmit an identical message to only a plurality of arbitrarily designated stations and a communication network system realizing the method.

In a local area network, when a message is independently transmitted from a given station to another station, communication is performed using a frame in which an address of a destination station is designated. A station compares the destination address designated in the frame with an address assigned thereto, and when the destination address and the assigned address are the same, the transmitted message is received thereby.

When an identical message is transmitted to all the stations in the network which includes stations having no need transmission of data, a multicast address, which is different from individual destination addresses used in individual message transmission to respective stations, is normally used to transmit the message. All the stations receive the transmitted message when a multicast address is designated in the transmitted frame.

An identical message is often transmitted to a plurality of specified stations connected to a local area network. In this case, conventionally, the message is transmitted using a multicast frame which includes a multicast address mentioned above. With this method, however, data is transmitted not only to necessary stations, but also to unnecessary stations.

Alternatively, the message can be individually transmitted to each of the specified stations with an independent frame. However, with this method, the occupying time of communication lines is increased, thus increasing the load of a network.

SUMMARY OF THE INVENTION

The present invention has been made in consideration of the above situation and has as its object to provide a limited multicast communication method and a communication network system realizing the method, wherein an identical message is transmitted to a plurality of arbitrarily designated stations.

In order to achieve the above object, the communication network system comprises:

comparison means (26) for holding input reference data, for checking, based on the held reference data, if a transmitted message is destined to an intrastation, and for generating an input instruction when it is determined that the transmitted message is destined to be sent to the intrastation;

data input/output means (22, 24, 30, 32) for storing a message, and for transmitting the stored message in response to an output instruction input thereto, in the case of transmission; and for outputting the destination address in the transmitted message to the comparison means (26), and for receiving the transmitted message in response to the input instruction input from the comparison means (26), in the case of reception;

control means (28) for outputting an intra-address to the comparison means (26) as the reference data, for writing a message to be transmitted in the data input/output means (22, 24, 30, 32) in accordance with one of completion of receiving the message and a transmission instruction, input thereto, indicating multicast communication or individual communication, and for outputting the output instruction to the data input/output means (22, 24, 30, 32) when the message is completed, in the case of transmission; and for checking the received message in the case of reception;

notice transmission means (28) for writing a notice message including an identifier in the data input/output means (22, 24, 30, 32) in accordance with the transmission instruction when it is determined that the input transmission instruction designates limited multicast communication;

notice receiving means (28) for outputting the identifier in the received notice message to the comparison means (25) as the reference data; and limited multicast message transmission means (28) for writing a limited multicast communication message having the identifier in the data input/output means (22, 24, 30, 32) in accordance with the transmission instruction, and wherein the comparison means (25) checks, based on the identifier as the reference data, if the limited multicast communication message transmitted is destined to be sent to the intrastation.

In order to achieve the above object, the method comprises:

transmitting a prior notice, including an identifier and indicating transmission of the identical text to the plurality of arbitrarily designated stations;

receiving the prior notice to hold the identifier in the prior notice, transmitting the identical text message including the identifier to the plurality of arbitrarily designated stations; and receiving the identical text message when the identifier therein coincides with the held identifier.

According to the limited multicast communication system of the present invention, when an identical message must be transmitted to a plurality of arbitrary stations, this is informed in advance by a prior notice to these stations. This allows limited multicast communication of an identical message to the plurality of arbitrary stations, thus improving transmission efficiency. Although the above procedures seem to require a plurality of times of transmission and to degrade the transmission efficiency, since the prior notice is much shorter than a text, it can be transmitted in a very short period of time, and hence, the overall transmission efficiency can be improved.

When the prior notice is transmitted to the arbitrary stations using a text identifier, different messages can be transmitted to these arbitrary stations using the same text identifier from a station other than a station which has transmitted the prior notice.

The prior notice is transmitted not by individual communication but by multicast communication, thus further improving the transmission efficiency.

BRIEF DESCRIPTION OF THE DRAWINGS

FIGS. 4A to 4H are sequence charts for explaining the operation when a limited multicast message is transmitted to only a plurality of arbitrarily designated stations, using the communication frames shown in FIGS. 3A and 3B;

FIGS. 7A to 7H and 7J and 7K are sequence charts for explaining the operation when a limited multicast message is transmitted using the transmission frames shown in FIGS. 6A and 6B;

PREFERRED EMBODIMENT OF THE INVENTION

A limited multicast message communication method and a communication network system realizing the method according to the present invention will now be described in detail with reference to the accompanying drawings.

Figure 2:
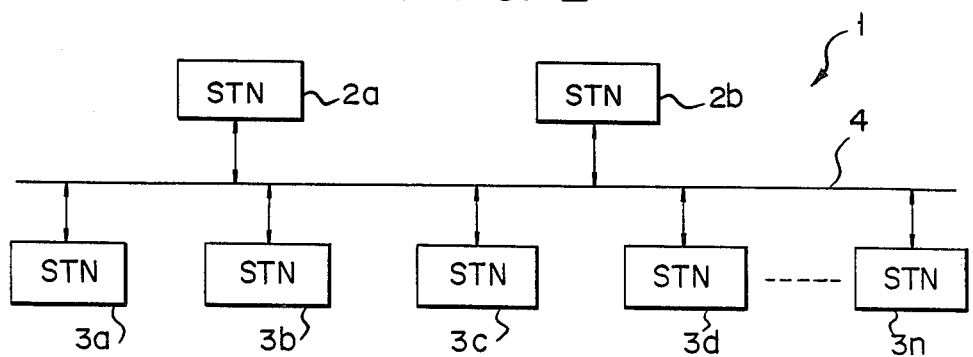
FIG. 2 is a diagram showing a local area network constituted by stations as shown in FIG. 1.

FIG. 2 shows local area network (LAN) 1 for realizing a limited multicast message communication method according to the present invention. A plurality of stations 2a to 3n are connected to each other through communication network 4.

Figure 1:
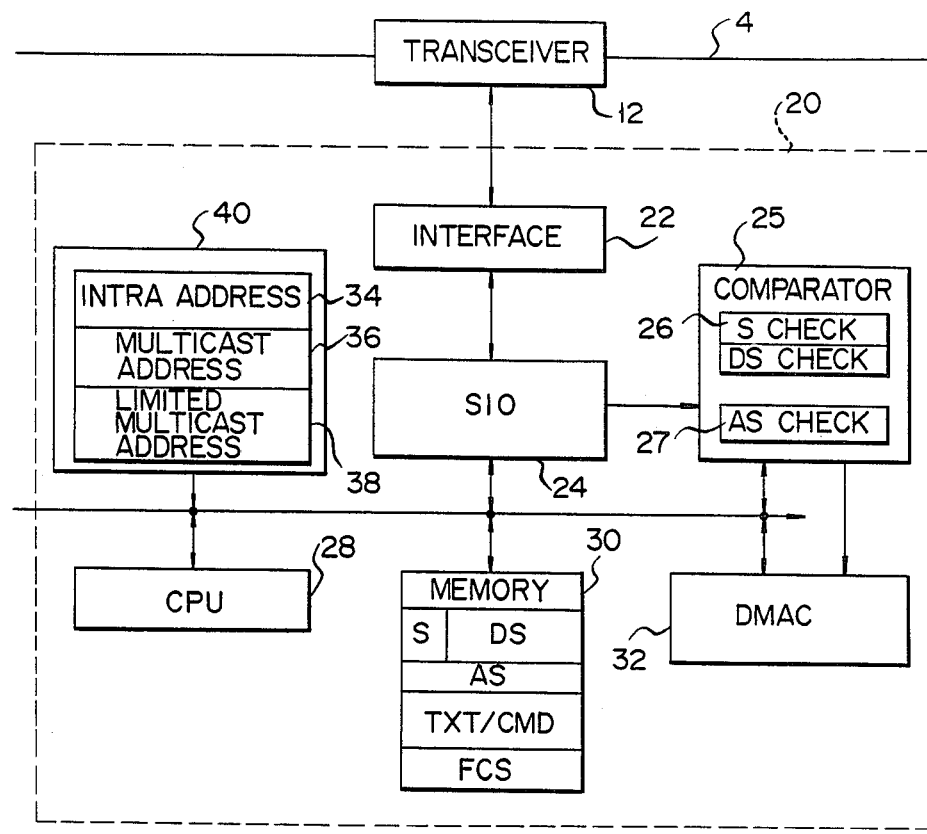
FIG. 1 is a detailed block diagram of each station to which multicast message communication of the present invention is applied.

FIG. 1 is a detailed block diagram of LAN interface section 20 of each station shown in FIG. 2. LAN interface section 20 operates to send data from terminals (not shown) connected thereto to network 4, and also to receive a frame including transmitted data from network 4. In FIG. 1, an interface to the terminals in each station is omitted. Referring to FIG. 1, LAN interface section 20 of each station is connected to communication network 4 through transceiver 12 for performing data communication between network 4 and section 20. Section 20 comprises interface 22, microprocessor (CPU) 28, memory 30, serial data input/output section (SIO) 24, direct memory access controller (DMAC) 32, comparator 25, and address table 40.

FIGS. 3A and 3B, FIGS. 6A and 6B, and FIGS. 9A and 9B show transmission frames used in a system realizing a limited multicast message communication method of the present invention. The transmission frame consists of flag field F in which a flag bit for frame synchronization is written, destination address field AD for indicating an address of a destination station, source address field AS for indicating an address of a source station, information field I in which information to be transmitted is written, frame check sequence field FCS in which a frame check sequence for checking errors is written, and flag field F indicating an end of the frame. This frame is formed under HDLC (High Level Data Link Control) procedures. Destination address field AD is divided into two sections, i.e., multicast designation field S for indicating whether a message is to be transmitted to an individual station designated by a destination station address or to a plurality of stations, and destination station address field DS in which the destination station address is written. When multicast designation field S is logic "1", this indicates multicast communication, and when it is logic "0", individual communication.

The information field I includes a command/ response field CMD and a text field TXT. When a text is transmitted, data indicating that the text is included in this frame, is set in the CMD field, and the text field TEXT includes the text to be transmitted. A transmission frame having this format is referred to as a text frame hereinafter. When a command or a response is transmitted, no field TXT is included in field I. And, the command or the response is designated in accordance with contents of the command/response field CMD. A frame for transmitting a command or a response is referred to as a command/response frame hereinafter.

Referring again to FIG. 1, address table 40 has area 34 for storing an intra-address for identifying this station itself, area 36 for storing a multicast address, and area 38 for storing a limited multicast address. In memory 30, fields AD, AS, I, and FCS are prepared. Comparator 25 has destination address check section 26, comprising a subsection for checking data in field S of a received frame and a subsection for checking data in field DS, and source address check section 27 for checking data written in field AS of the received frame.

During a reception operation, a message on network 4 is received by transceiver 12, and is supplied to SIO 24 through interface 22. SIO 24 fetches transmission data, synchronizing with a flag bit written in field F, and resets the flag bit. Data written in field AD of a received message is sent to comparator 25. Comparator 25 compares the data written in field AD with an address assigned to this station (STATION ADDRESS), a multicast address or a limited multicast address so as to determine if a transmitted message is to be fetched. If it is necessary to determine whether the message should be received or not according to a source station address, data written in field AS is also sent to comparator 25 to be compared to data for identifying a source station which has been set prior to the reception of the frame. This situation will be explained later in detail. As a result of comparison, if it is determined that the transmitted message is to be fetched, comparator 25 instructs DMA transfer to DMAC 32. In response to this instruction, DMAC 32 transfers to memory 30 predetermined data, e.g., data from field AS to field FCS, of frame received by SIO 24. The data is stored in a predetermined area in memory 30. When SIO 24 detects the last flag bit in a trailing field F, it completes a reception operation, and leaves the flag bit.

During preparing a transmission message, data in the transmission message is stored in memory 30 by CPU 28. Thereafter, when the message is transmitted, a flag bit of field F is generated by SIO 24, and subsequently, data read out from memory 30 is sent to SIO 24 by DMAC 32. SIO 24 transmits the data onto network 4 through interface 22 and transceiver 12. At last, SIO 24 generates and transmits the flag bit of the trailing field F at the end of the frame.

Figure 3A:
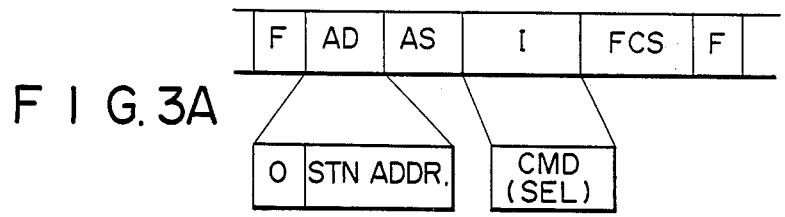
FIGS. 3A and 3B are formats of a transmission frame for transmitting a command or response including a prior notice and a text transmission frame used in a first embodiment of limited multicast communication.

In the first embodiment, for designating a plurality of designated stations, to all of which an identical message is transmitted from a given station, the source station sends a frame shown in FIG. 3A to each of the designated stations. In the frame (hereinafter called as to a SEL frame), an address of one of the designated stations (STN ADDR.) is written in the AD field, and also a command SEL for designating a station as the designated station is written in the command/response field CMD of the field I. Then, in this embodiment, a text is transmitted with a multicasting text frame shown in FIG. 3B.

Figure 3B:
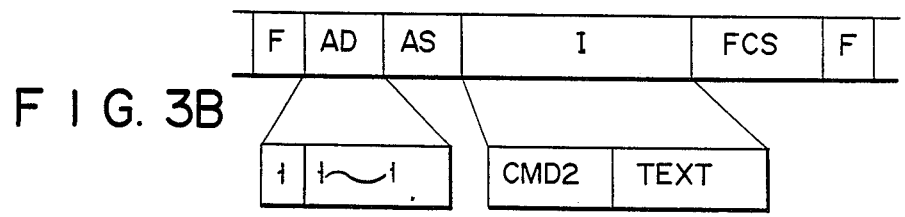

Transmitting procedure in a first embodiment using the transmission frames shown in FIGS. 3A and 3B will be described in detail with reference to FIGS. 4A to 5B. The ordinates in FIGS. 4A to 4H represent time. In (XX, YY, ZZZ) in FIGS. 4A to 4H, XX indicates a destination station address for a frame, YY indicates a source address, and ZZZ indicates a command, response or text. If ZZZ is SEL, this indicates a command for defining a station as the designated station for limited multicast communication; ACK, this indicates an acknowledge response from a destination station; T, this indicates that the text is transmitted; and END, this indicates completion of limited multicast communication.

In order to better understand the operation of the limited multicast message communication system of the present invention, conventional individual communication, in which station 2a transmits a message to station 3a will now be described. In this case, the following message frame is transmitted to station 3a. In this message frame, "0" is written in field S to indicate that this frame is transmitted to a indivisual station, address 3a of the destination station 3a is written in field DS, address 2a of the source station 2a is written in field AS, command CMD2 indicating individual text transmission is written in field CMD of information field I, and a text to be transmitted in field TXT thereof.

Station 3a receives the message frame from station 2a, and sends back a response indicating the reception of the text to station 2a. At this time, in the message, "0" is written in field S, address 2a of the source station 2a is written in field DS, address 3a of the destination station 3a is written in field AS, and a response ACK indicating that the station 3a has correctly received the message frame is written in field I.

Thereafter, station 2a transmits command END indicating the completion of transmission to station 3a using a command/response frame, and station 3a sends back a response indicating the reception of this command. In this manner, text transmission to individual stations is performed.

Provided that different identical messages are transmitted from stations 2a and 2b respectively to stations 3a and 3b, and stations 3c and 3d, with reference to FIGS. 4A to 4H, limited multicast communication according to the present invention will now be described.

Assume that a terminal device (not shown) connected to a LAN interface section 20 of station 2a delivers a transmission instruction indicating limited multicast communication defining a plurality of stations 3a and 3b as destination stations. CPU 28 checks the content of the transmission instruction. If it is determined that the transmission instruction represents limited multicast communication defining the destination stations 3a, 3b, station 2a individually transmits command/response frames including SEL command, to the destination stations 3a and 3b, and individually notices to the stations 3a and 3b that an identical message is to be transmitted thereto, as shown in FIGS. 4A and 4B. Since the notices are sent to the destination stations prior to transmission of the identical message, the notice is referred to as a prior notice hereinafter. When the station 2a sends a frame for the prior notice to station 3a, in memory 30, "0" is written in S, address 3a of station 3a is written in field DS, address 2a is written in field AS, and command SEL is written in field CMD. Thereafter, frame check sequence FCS is generated to complete the message. CPU 28 then outputs a transmission DMA transfer instruction to DMAC 32, so that the message is sent to SIO 24 by DMAC 32. SIO 24 generates a flag bit of leading field F, and then adds the flag bit to the head of the data transferred by DMAC 32. SIO 24 serially transmits the leading flag bit and the data to station 3a through interface 22 and transceiver 12. Upon completion of transmission of the received data, SIO 24 finally generates a flag bit of trailing field F and also transmits it.

Figure 5A:
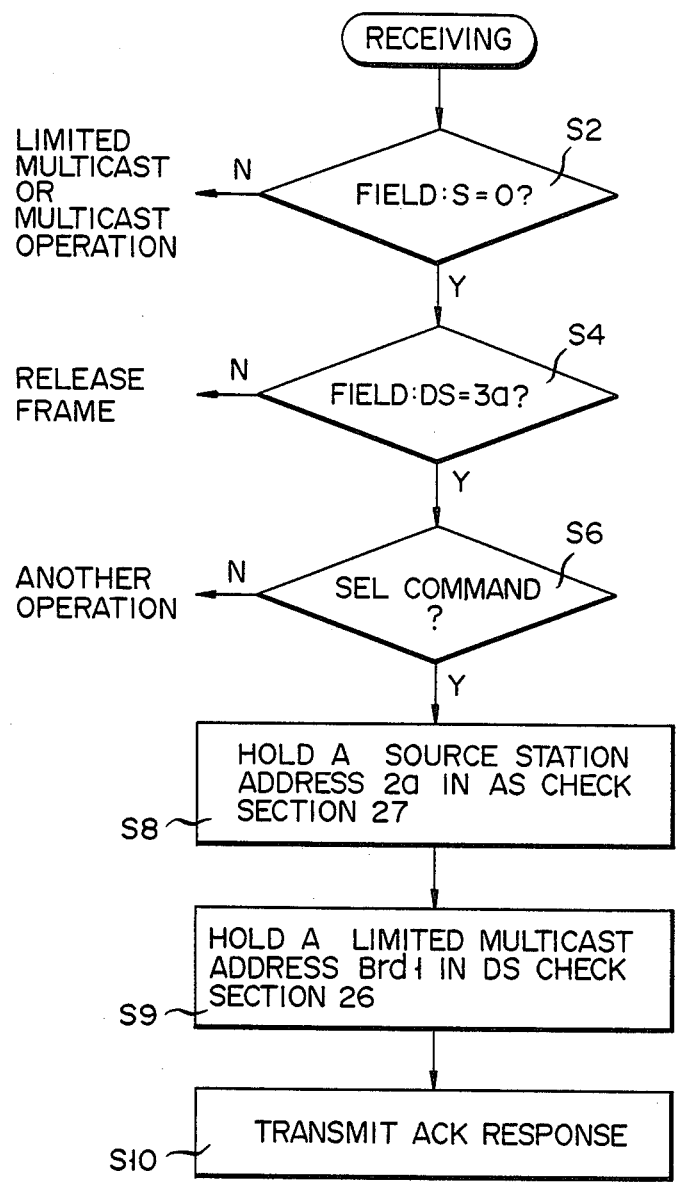
FIGS. 5A and 5B are flow charts for explaining the operation upon reception of a prior notice and a text in the first embodiment.

An operation when station 3a receives the prior notice will be described with reference to FIG. 5A.

Intra-address 3a stored in the area 34 of the table 40 is sent to comparator 25 in advance by CPU 28, and is normally held in destination address check section 26. And also, (nonlimited) multicast address Brd stored in the area 36 of the table 40 is sent to comparator 25 in advance, and is normally held in destination address check section 26 for receiving multicast message frame. In station 3a, serial data received by transceiver 12 is supplied to SIO 24 through interface 22.

It is then checked if the transmitted message is destined to be sent to station 3a. More specifically, data in field S of the field AD received by SIO 24 is sent to comparator 25 in step S2 and is checked. If the data is "0", an address written in field DS is transmitted to comparator 25 to be compared to an intraaddress, i.e., 3a in this case, in step S4. If it is determined that the transmitted message is destined to be sent to station 3a, comparator 25 outputs to DMAC 32 a DMA transfer instruction for transferring the received data from SIO 24 to the memory 30.

DMAC 32 causes memory 30 to store data from field AD to field FCS received by SIO 24 in response to the instruction from comparator 25. In step S6, the content written in field CMD is interpreted by the CPU 28. If the content corresponds to a command defining limited multicast communication from the station written in field AS, i.e., SEL, address 2a written in field AS is sent to comparator 25 in step S8, and is held in check section 27. And further, a limited multicast address Brdl stored in the area 38 of the table 40 is sent to the comparator 25, and is held in check section 26 in Step 9. After this preparation for reception of a limited multicast frame, station 3a individually transmits response ACK to station 2a using a command/response frame in step S10.

If N is obtained in step S2, the operation turns to a operation for receiving a multicast or limited multicast message frame. If N is obtained in step S4, a message reception operation in station 3a is interrupted, and the received message is released. If N is obtained in step S6, CPU 28 operates another function according to the contents written in the CMD field. As a matter of curse, when an error in the received message frame is detected by a check of the FCS field in the SIO 24, the received message frame is instantly released.

As mentioned above, station 2a also transmits a prior notice to station 3b in the same manner as in station 3a. This state is shown in FIG. 4B. After station 2a transmits command SEL to destination stations 3a and 3b, and receives responses ACK indicating a reception enable state from them, preparation for limited multicast communication is completed. Therefore, comparators 25 of stations 3a and 3b hold address 2a of the source station 2a and limited multicast address Brdl.

When station 2b also performs limited multicast communication with stations 3c and 3d, it receives in advance reception enable responses from stations 3c and 3d as shown in FIGS. 4C and 4D, in the same manner as in FIGS. 4A and 4B. Therefore, address 2b is held in comparators 25 of stations 3c and 3d.

As shown by (Brdl, 2a, T) in FIG. 4E, station 2a transmits a limited multicast text message onto the network using a text frame. In the format of the limited multicast frame, "1" indicating multicast communication is assigned to field S of field AD, a limited multicast address Brdl, indicating limited multicast communication, is assigned to field DS of field AD, and address 2a of source station 2a is assigned to field AS. In a text field, a text to be transmitted, instructed by the transmission instruction, is written, and command CMD2 indicating text communication is written in a command field. This text message frame is sent onto network 4.

Figure 5B:
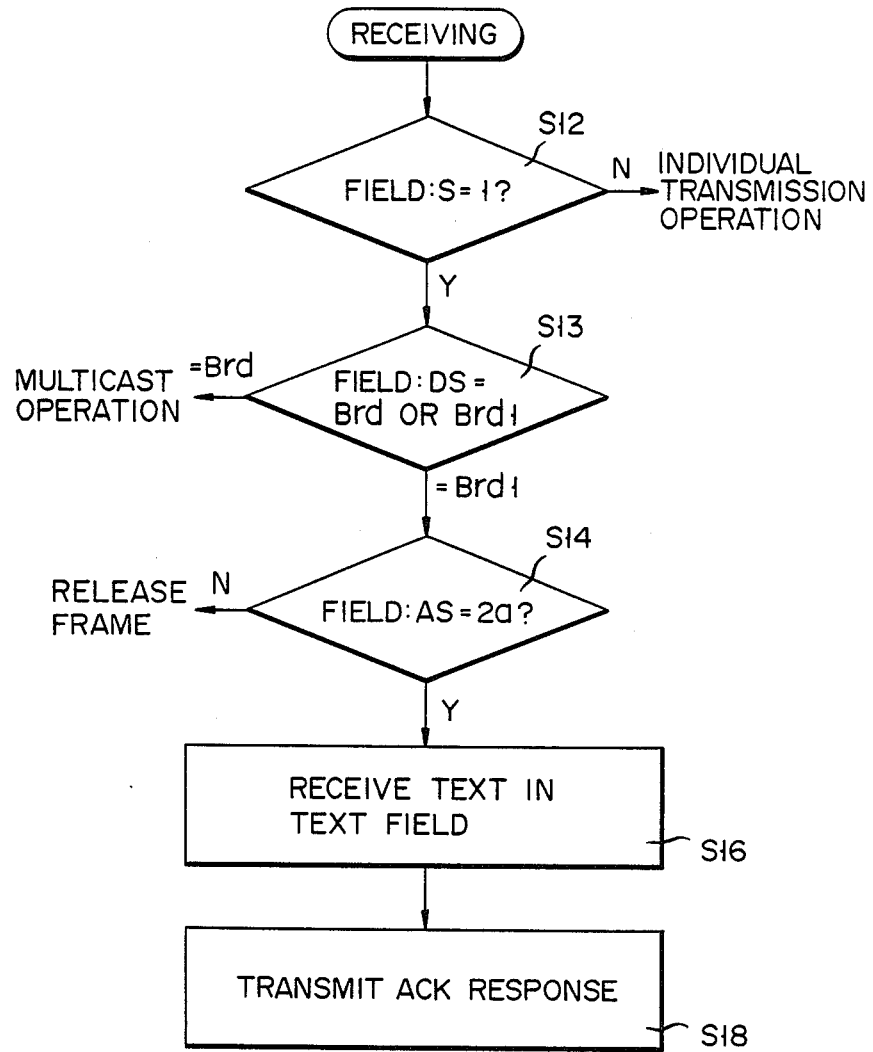

When stations receive the limited multicast frame, the stations discriminates from data in field S using check section 26 that the transmitted message is the multicast message frame, as shown in step S12 in FIG. 5B. If data in field S is logic "1", it is checked whether data written in field DS is a limited multicast address Brdl or a multicast address Brd by DS check section 26 of comparator 25 in step 13. As a result, if the message is merely a multicast communication message, a DMA transfer instruction is output to DMAC 32. However, if the message is a limited multicast communication message, step S14 is executed, and field AS is referred to by check section 27. In step S14, it is checked if an address written in field AS coincides with an address held therein, i.e., 2a. In this example, the address in field AS coincides with the address held in the AS check section 27 i.e., 2a, in the stations 3a and 3b. In the stations 3a and 3b, a DMA transfer instruction is output from comparator 25 to DMAC 32. In step S16, DMAC 32 sends the text written in field I of the transmitted message to memory 30. Thereafter, when SIO 24 detects the flag bit, the reception operation is completed.

Upon completion of the reception, as shown in FIG. 4E, station 3a sends back to station 2a a response indicating that the limited multicast message is correctly received, in step S18. Station 3b also performs the same operation. As mentioned above, stations 3a and 3b receive the limited multicast message frame from station 2a. However, since stations other than stations 3a and 3b have not received the prior notice from the station 2a, they do not receive this limited multicast message frame transmitted by station 2a.

For preventing collisions between response frames from stations 3a and 3b, a time delay may be established between transmittions of them.

Similarly, the multicast message from station 2b is received by only stations 3c and 3d, as shown in FIG. 4F, and is not received by other stations. Then, stations 3c and 3d send back to station 2b responses indicating that the multicast message has been received.

Upon completion of transmission of the limited multicast message, station 2a transmits to stations 3a and 3b a multicast message frame, in which command END indicating the completion of transmission of the limited multicast message, is written in command field CMD of the command/response frame shown in FIG. 3A, as shown in FIG. 4G. Stations 3a and 3b receive this message, and complete the reception operation of limited multicast communication.

Similarly, upon completion of transmission, station 2b transmits a multicast message end command to stations 3c and 3d, as shown in FIG. 4H, in the same manner as described above, thus completing the transmission of the limited multicast message.

In this manner, since reception of the limited multicast message is determined by the check of a source station address, respective groups of source stations can simultaneously transmit limited multicast message frames to stations desired by each source station.

An operation of a second embodiment in which a text is transmitted from an arbitrary station, for example, station 2a or 2b to a plurality of designated stations, for example, station 3a to 3d, will be described in detail with reference to FIGS. 6A to 8B. In this embodiment, source address check section 27 of comparator 25 and limited multicast address area 38 of address table 40 in the first embodiment can be omitted.

The terminal device connected to LAN interface section 20 of station 2b delivers to CPU 28 a transmission instruction for designating limited multicast communication with selecting stations 3a and 3b as destination stations. CPU 28 interpets the instruction and operates functions for limited multicast communication. As shown in FIGS. 7A and 7B, station 2b individually transmits a prior notice to designated stations 3a and 3b via network 4 using a command/ response frame shown in FIG. 6A, in the same manner as in the first embodiment. In the frame for this notice, logic "0" indicating individual transmission of the frame is written in field S of field AD, and an address of a destination station 3a or 3b of this command/response frame is written in field DS of field AD. Command CMD1 indicating a prior notice for limited multicast communication and text identifier B1, which the destination stations use for identifying a limited multicast frame from station 2b, are written in field I. Note that the text identifier can be applied to each text to be transmitted. In (3a, 2b, B1) in FIG. 7A, B1 indicates the text identifier.

Figure 8A:
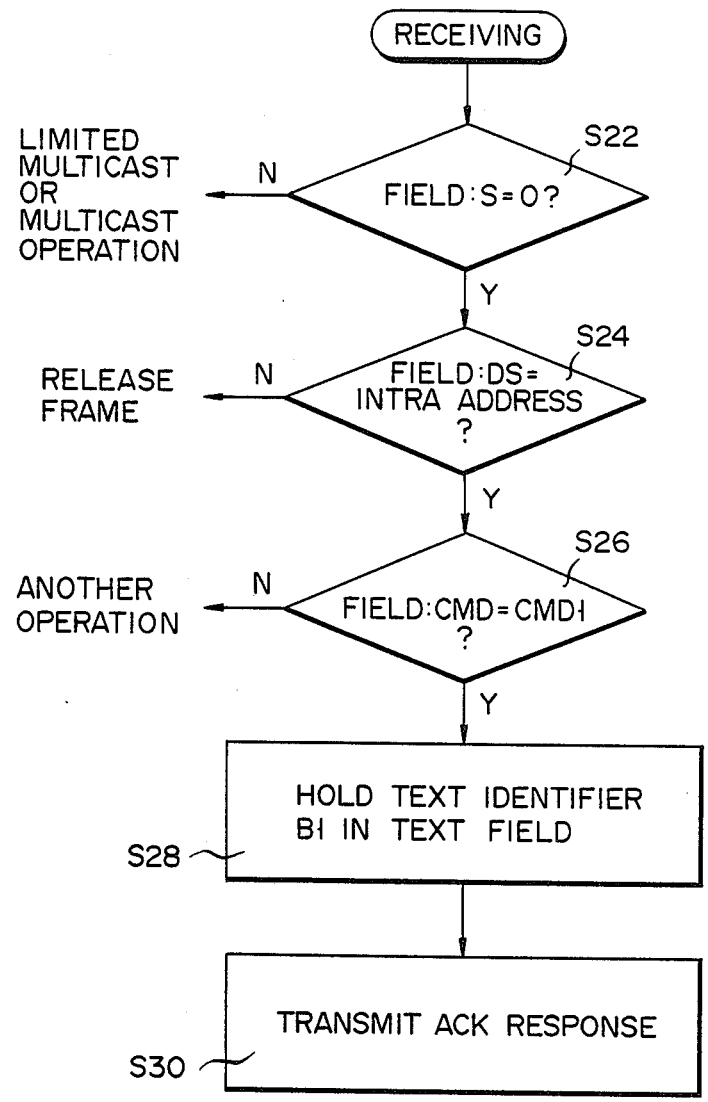
FIGS. 8A and 8B are flow charts for explaining the operation upon reception of a prior notice and a text in the second embodiment.

When a station receives the frame, data in field S of the transmitted notice message is checked by check section 26 of comparator 25, in step S22 in FIG. 8A. If the data "0" and indicates individual communication, an address written in field DS is checked in step S24. An intra-address of the station is normally prestored in check section 26, and it is determined if the input address coincides with the prestored intra-address. As a result, n station 3a, it is confirmed that the transmitted frame is destined to be sent to station 3a. Data received by section 20 of station 3a is transferred to memory 30 by DMAC 32 therein.

It is checked in step S26 if data in field I is command CMD1. If command CMD1 is detected, the text identifier following data CMD1 in the transmitted notice message is sent to comparator 25 in step S28, and is held in check section 26. If the reception operation is completed upon detection of the flag bit, station 3a transmits response ACK to station 2b. The above operation is also applied station 3b, as shown in FIG. 7B. As a result, text identifier B1 is held in stations 3a and 3b.

Similarly, station 2a individually sends text identifier B2 to stations 3c and 3d, as shown in FIGS. 7C and 7D, in the same manner as in station 2b. In this transmission frame, logic "0" is written in field S, address 3c or 3d is written in field DS, and address 2a of station 2a is written in field AS. Command CMD1 and another text identifier B2 are written in field CMD. Stations 3c and 3d receive this notice, and hold text identifier B2 therein. As a result, stations 3a and 3b hold text identifier B1, and stations 3c and 3d hold text identifier B2.

Figure 6A:
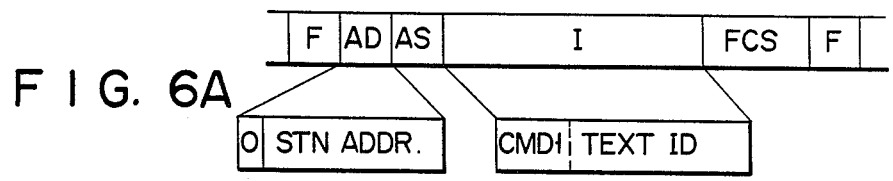
FIGS. 6A and 6B are formats of a transmission frame for transmitting a command or response including a prior notice and a text transmission frame for transmitting a text in a second embodiment of limited multicast communication in which a text identifier is defined.
Figure 6B:
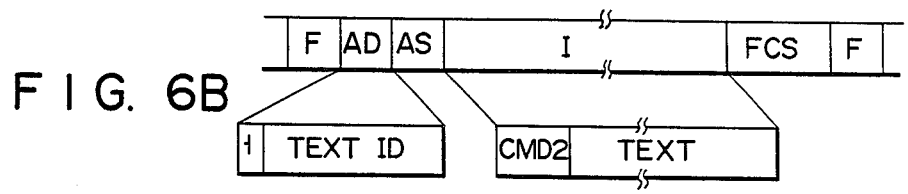

As shown in FIGS. 7E and 7F, texts including text identifiers B1 and B2 are respectively transmitted from stations 2a and 2b by limited multicast communication using the frame shown in FIG. 6B. At this time, in the text frame sent out from station 2b (2a), logic "1" is written in field S of field AD, and text identifier B1 (B2) is written in field DS. Address 2b (2a) is written in field AS, and command CMD2 indicating text transmission and a text corresponding to text identifier B1 (B2) are written in field I.

Stations 3a to 3n selectively receive a frame only when data written in field DS of a message on network 4 coincides with a text identifier stored therein. Therefore, in this case, a limited multicast message from station 2b is simultaneously received by only destination stations 3a and 3b.

Figure 8B:
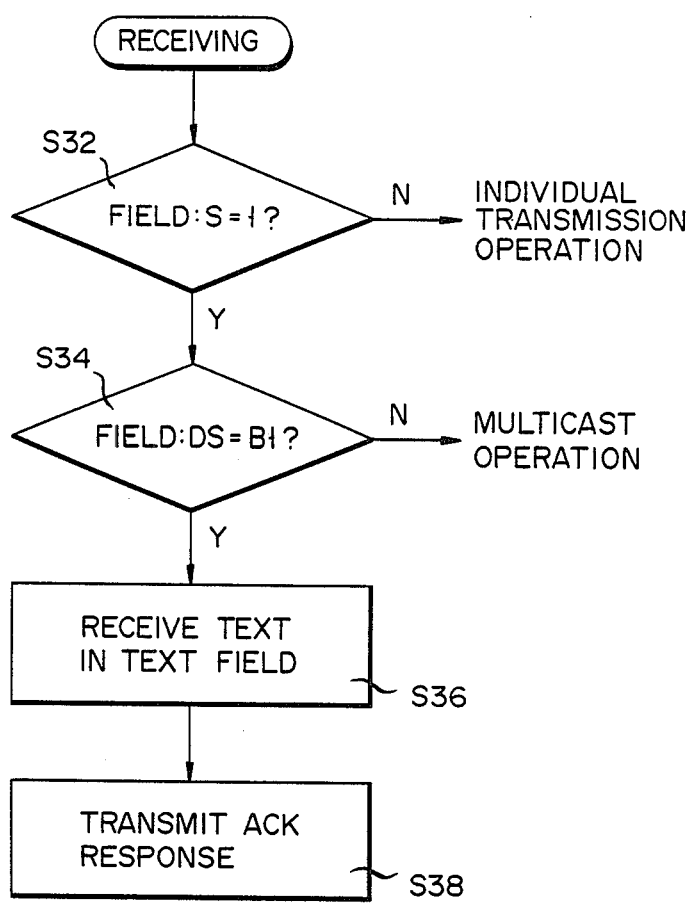

More specifically, when the message is transmitted, comparators 25 of stations 2a or 3n discriminate from data written in field S that the transmitted message frame is the multicast message frame, in step S32 in FIG. 8B. When data in field S is "1", field DS is referred to in step S34 to check by check section 26 if the text identifier written therein coincides with the text identifier and a multicast address Brd held therein. If a coincidence with the text identifier held therein is found, the text written in field TXT of the transmitted limited multicast message frame is received by SIO 24 and is written in memory 30 by DMAC 32, in accordance with the receiving DMA transfer instruction generated from comparator 25. When SIO 24 detects the flag bit, the reception operation is completed. Upon correct completion of reception, as shown in FIG. 7E, stations 3a and 3b send back to station 2b response ACK indicating that the limited multicast message is correctly received. However, since stations other than stations 3a and 3b have not received text identifier B1 by the prior notice, they do not receive this message frame, and the transmitted limited multicast message frame is ignored.

Similarly, station 2a sends a limited multicast message including a text having text identifier B2, and the transmitted message is received by stations 3c and 3d. This state is shown in FIG. 7F.

Text having a text identifier B1 is transmitted from station 2b and text having a text identifier B2 is transmitted from station 2a. FIGS. 7G and 7H show a case wherein station 2a transmits a limited multicast message including a text having text identifier B1 to stations 3a and 3b, and station 2b transmits a limited multicast message including a text having text identifier B2 to stations 3c and 3d. In this case, it is not important from which station a limited multicast message is transmitted, but is important whether or not a transmitted message frame has the same text identifier. Therefore, the same source station can transmit different limited multicast message frames to different groups of destination stations.

When a transmitted message is received by designated stations and limited multicast communication is completed, stations 2a and 2b send an end command to stations 3a to 3d in the same manner as described above.

Note that if a text volume to be transmitted is larger than a data volume which can be transmitted by a single multicast frame, the data are transmitted with a plurality of limited multicast message frames. This applies to other embodiments as well.

A third embodiment for improving efficiency of limited multicast communication will be described with reference to frame formats shown in FIGS. 9A and 9B, sequence charts in FIGS. 10A to 10D, and flow charts shown in Figs. 11A and 11B. In this embodiment, source address check section 27 and limited multicast address area 38 of address table 40 shown in FIG. 1 can be omitted.

Figure 9A:
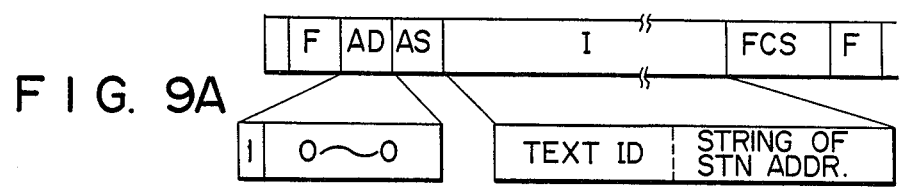
FIGS. 9A and 9B are formats showing a transmission frame for transmitting a command or response including a prior notice and a text transmission frame for transmitting a text in a third embodiment of limited multicast communication in which a text identifier is defined.
Figure 9B:
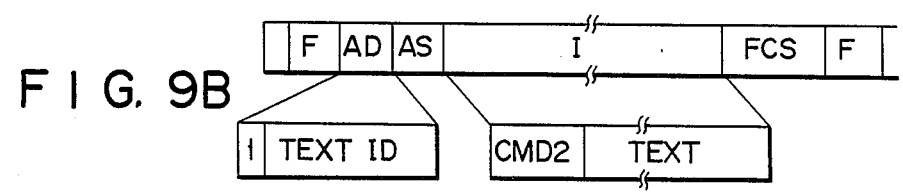

FIGS. 9A and 9B are formats of a command/response frame and a text frame used in this embodiment. The same fields as in the above embodiments are used in this embodiment.

When data written in field S is "1", if data written in field DS is all "0" as shown in FIG. 9A, this indicates that the corresponding frame is used for transmitting a prior notice for performing limited multicast communication.

When the frame is used for a prior notice, information field I, i.e., a predetermined field of the command field is used for designating a text identifier for identifying a message to be transmitted to a plurality of arbitrary stations, and the remaining field thereof is used for designating addresses of a plurality of destination stations for receiving the notice. When a multicast message is transmitted, a normal text is written in information field I together with a command CMD2.

CPU 28 in station 2a receives a transmission instruction for designating limited multicast communication from a terminal connected thereto, and interface section 20 source station 2a transmits to, for example, stations 3a, 3b, and 3d a prior notice in which a text indicated by text identifier B1 is defined. In this embodiment, source station 2a must notify text identifier B1 to stations 3a, 3b, and 3d using a command/response frame shown in FIG. 9A. Station 2a produces in memory 30 a message in which data "1" is written in field S, a multicast address Brd, for example, all "0"'s are written in field DS, and text identifier B1 and station addresses 3a, 3b, and 3d of stations 3a, 3b, and 3d are written in information field I. Then, station 2a sends out the prior notice message frame onto network 4 through SIO 24 and interface 22. Since this notice is transmitted by multicast communication, it is received by the respective stations.

Stations 2b, 3a to 3n, other than station 2a, receive the notice message to check if their intra-addresses are written in an area, following a text identifier (B1), of information field I, when the message on network 4 is a notice for executing limited multicast communication. The state will be explained with reference to station 3a in conjunction with FIG. 11.

Figures 10A, 10B, 10C:
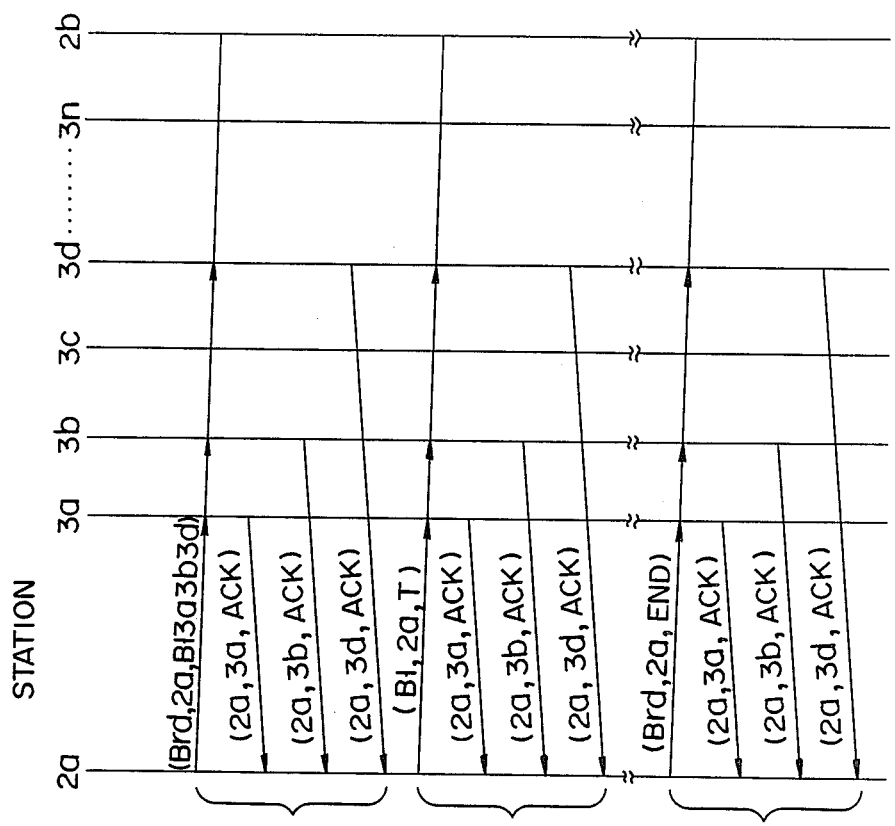
FIGS. 10A to 10C are sequence charts for explaining the operation when a limited multicast message is transmitted using the transmission frames shown in FIGS. 9A and 9B.
Figure 11:
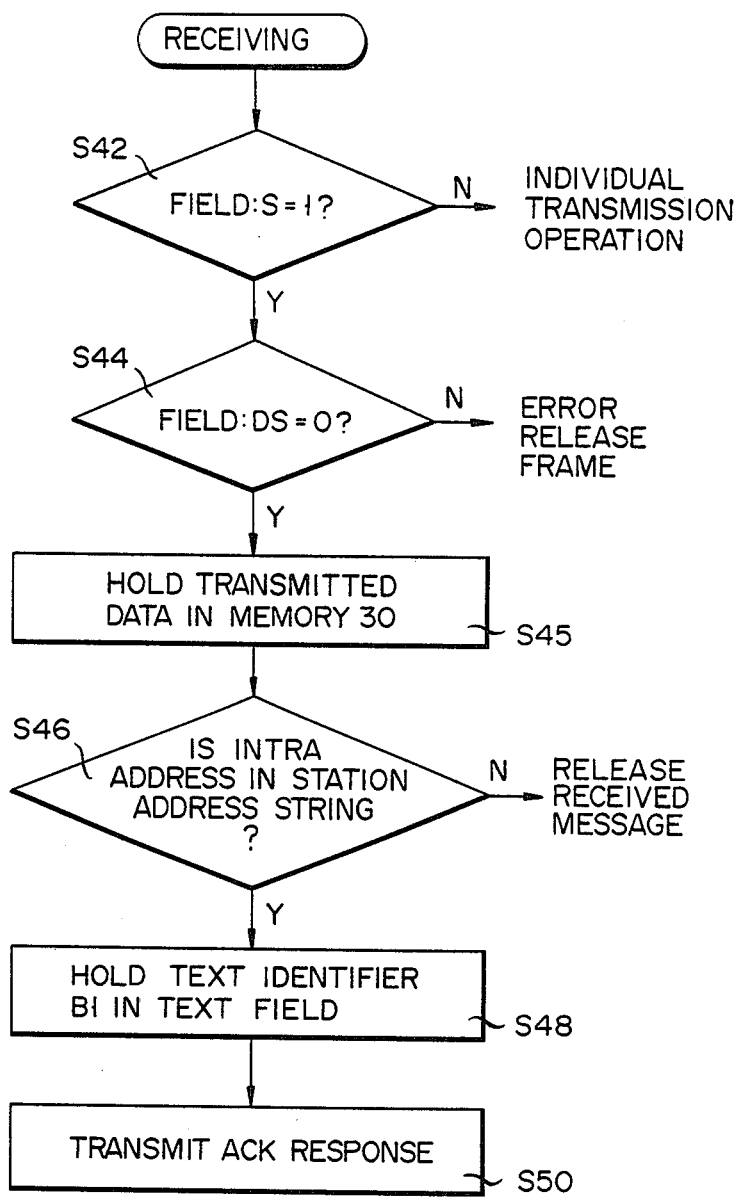
FIG. 11 is a flow chart for explaining the operation upon reception of a prior notice in the third embodiment.

When station 2a multicast-transmits a text identifier for performing limited multicast communication using the command/response frame shown in FIG. 9A, comparator 25, for example, of station 3a checks in step S42 if data "1" is written in field S. If Y in step S42, it is then checked in step S44 if all "0" bit data is set in DS. If Y in step S44, a message transmitted with this frame are transferred to memory 30 by DMAC 32 and hold therein. It is checked in step S46 if its intra-address is present in command field CMD. If Y in step S46, text identifier B1 written in field CMD is transferred to check section 26 and is held therein in step S48. In step S50, station 3a transmits response ACK to station 2a. The same operation is performed in other stations 3b and 3d. This state is illustrated in FIG. 10A.

In this embodiment, addresses of stations 3a, 3b, and 3d are set in the above-mentioned area. When stations 3a, 3b, and 3d detect their intra-addresses in the transmission frame, they determine that this message is a prior notice of limited multicast communication defining text identifier B1 set in the starting area of information field I, and they hold text identifier B1 therein. In contrast to this, since stations 2b, 3c, and 3e to 3n detect that their intra-addresses are not set in the transmission frame, they determine that this message is not a prior notice for limited multicast communication destined to themselves, and release the message. Therefore, station 2a can multicast-transmit a prior notice only to stations 3a, 3b, and 3d as destinations of the limited multicast message.

After stations 3a, 3b, and 3d are allowed to receive the limited multicast message frame, a limited multicast message having a frame format shown in FIG. 9B is sent onto network 4 from source station 2a and is received by destination stations 3a, 3b, and 3d, in the same manner as in the flow chart shown in FIG. 8B. In the limited multicast message, data "1" indicating multicast communication is set in field S of field AD, and text identifier B1 is set in field DS. More specifically, since the text identifier is defined in limited multicast communication, the source station need not be defined.

Stations 3a to 3n other than stations 2a and 2b selectively receive the message when the frame on network 4 is a limited multicast frame, i.e., other than a frame in which data "1" is set in field S of field AD and all "0" bit data is set in field DS and when a text identifier in field DS coincides with the previously noticed text identifier. Therefore, in this case, the limited multicast message frame from the source station 2a are simultaneously received only by stations 3a, 3b, and 3d.

In this embodiment, the text identifier has been taken into consideration. However, limited multicast communication in which a source station is defined as the first embodiment can also be considered for identifying a source station which has transmitted a limited multicast message frame with the text identifier.

In order to transmit a specific text from a specific station by limited multicast communication, first and third embodiments can be combined.

A specific command for separating a prior notice multicast message frame from a normal multicast message frame may be written in the field.

In the above description, multicast communication and limited multicast communication have been separately considered. However, the main feature of the present invention can also be applied if limited multicast communication corresponds to normal multicast communication.

What is claimed is:

1. A communication network system to which a plurality of stations are connected through a communication network, in which an identical message is transmitted to a plurality of arbitrarily designated stations, comprising:

comparison means for holding input reference data, for checking, based on the held reference data, if a transmitted message is destined to be sent to an intrastation, and for generating an input instruction when it is determined that the transmitted message is destined to be sent to the intrastation;

data input/output means for storing a message, and for transmitting the stored message in response to an output instruction input thereto, in the case of transmission; and for outputting a destination address in the transmitted message to said comparison means, and for receiving the transmitted message in response to the input instruction input from said comparison means, in the case of reception;

control means for outputting an intra-address to said comparison means as the reference data, and for writing the message to be transmitted in said data input/output means in accordance with one of completion of receiving the transmitted message and a transmission instruction, input thereto, indicating multicast communication or individual communication, and for outputting the output instruction to said data input/output means when the message is completed, in the case of transmission; and for checking the transmitted message in the case of reception;

notice transmission means for writing a notice message including an identifier in said data input/output means in accordance with the transmission instruction when it is determined that the input transmission instruction designates limited multicast communication;

notice receiving means for outputting the identifier in the received notice message to said comparison means as the reference data; and limited multicast message transmission means for writing a limited multicast communication message having the identifier in said data input/output means in accordance with the transmission instruction, and wherein said comparison means checks based on the identifier as the reference data if the limited multicast communication message transmitted is destined to be sent to the intrastation.

2. The system according to claim 1, wherein said notice transmission means includes means for writting the notice message including as the identifier a text identifier for defining a text in said data input/output means, said notice receiving means includes means for outputting the text identifier written in the received notice message as the reference data, to said comparison means, and said limited multicast message transmission means includes means for writing the limited multicast communication message including the text identifier in said data output/input means.

3. The system according to claim 2, wherein said notice transmission means includes means for writing an address of one of stations designated by the transmission instruction as the destination address in the notice message, and means for sequentially and individually transmitting the notice message to the stations designated by the transmission instruction.

4. The system according to claim 2, wherein said notice transmission means includes means for writing a multicast address as the destination address of the notice message, the text identifier and a string of addresses of the stations designated by the transmission instruction.

5. The system according to claim 1, wherein
said comparison means further comprises means for receiving a source address as additional reference data from said data input/output means, and for checking, based on the additional reference data input and held therein, if the transmitted message is a message destined to be sent to the intrastation,
said notice transmission means includes means for writing the notice message including a command indicating the limited multicast communication in said data input/output means,
said notice receiving means further comprises means for outputting an address of a source station written in the received notice message to said comparison means as the additional reference data when it is determined that the command in the received notice message designates the limited multicast communication, and
said limited multicast message transmission means includes means for writing the limited multicast communication message including a limited multicast address as the destination address and the intra-address as the source address in said data input/output means.

6. The system according to claim 5, wherein
said notice transmission means includes means for writing an address of the one of stations designated by the transmission instruction as the destination address of the notice message, and
means for sequentially and individually transmitting the notice message to the stations designated by the transmission instruction.

7. The system according to claim 5, wherein
said notice transmission means includes means for writing the multicast address as the destination address of the notice message, and the command indicating the limited multicast communication and a string of adresses of the stations designated by the transmission instruction.

8. In a communication network system to which a plurality of stations are connected through a communication network, in which an identical text message is transmitted to a plurality of arbitrarily designated stations, a limited multicast communication method comprising:
transmitting a prior notice, including an identifier and indicating transmission of the identical text to the plurality of arbitrarily designated stations;
receiving the prior notice to hold the identifier in the prior notice, and
transmitting the identical text message including the identifier to the plurality of arbitrarily designated stations; and
receiving the identical text message when the identifier therein coincides with the held identifier;
wherein a text identifier for designating a text is defined in the prior notice as the identifier.

9. The method according to claim 8, wherein
said transmitting of the prior notice includes sequentially and individually transmitting to the prior notice the plurality of arbitrarily designated stations.

10. The method according to claim 8, wherein the prior notice is transmitted using a frame including an address of a destination station, a command indicating the prior notice, and the text identifier, and
said receiving of the prior notice includes discriminating from the address of the destination address that the transmitted message is the prior notice, the text identifier in the prior notice.

11. The method according to claim 8, wherein
said transmitting of the prior notice includes multicast-transmitting the prior notice to the plurality of arbitrarily designated stations.

12. The method according to claim 8, wherein the prior notice is multicast-transmitted using a frame including multicast address, the text identifier, and a string of addresses of the plurality of arbitrarily designated stations, and
said receiving of the prior notice includes discriminating from the multicast address that the prior notice is to be sent to an intrastation, to hold the text identifier when the intra-address is detected in the string of addresses.

13. The method according to claim 8, wherein
said transmitting of the identical text message includes multicast-transmitting the identical text message including the text identifier, and
said receiving of the identical text message includes discriminating that the identical text message is destined to be sent to an intrastation, comparing the received text identifier with the held text identifier, to receive the text in the text message.

14. In communication network system to which a plurality of stations are connected through a communication network, in which an identical text message is transmitted to a plurality of arbitrarily designated stations, a limited multicast communication method comprising:
multicast-transmitting from a source station a prior notice, including an address of a source station defined as an identifier, a multicast address indicating multicast transmission, a command indicating that the message is the prior notice, and a string of addresses of the plurality of arbitrarily designated stations;
receiving the prior notice to discriminate from the multicast address that the prior notice is destined to be sent to an intrastion, and to hold the identifier in the prior notice when an intra-address is detected in the string of addresses;
transmitting the identical text message including the identifier from the source station to the plurality of arbitrarily designated stations; and
receiving the identical text message when the identifier therein coincides with the held identifier.

15. The method according to claim 14, wherein
said transmitting of the identical text message includes transmitting the identical text message including the address of the source station defined in the prior notice and a limited multicast address for indicating limited multicast transmission, from the source station, and
said receiving of the identical text message includes discriminating that the text message is a limited multicast message from the limited multicast address, and that the text message is destined to be sent to an instrastation, comparing the address of the source station in the text message with the held address as the identifier, to receive the text in the text message.

* * * * *